United States Patent
Shinohara et al.

(10) Patent No.: US 6,819,994 B2
(45) Date of Patent: Nov. 16, 2004

(54) TRANSMISSION ELECTRONIC CONTROL UNIT

(75) Inventors: Takafumi Shinohara, Hyogo (JP); Hideaki Nagata, Hyogo (JP); Ichiro Tomita, Hyogo (JP); Naoyuki Takaishi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 54 days.

(21) Appl. No.: 10/392,932

(22) Filed: Mar. 21, 2003

(65) Prior Publication Data

US 2003/0212477 A1 Nov. 13, 2003

(30) Foreign Application Priority Data

Mar. 25, 2002 (JP) ........................................ 2002-084505

(51) Int. Cl.[7] ................................................ G06F 7/00
(52) U.S. Cl. .............................. 701/51; 701/1; 180/337; 180/338; 477/34
(58) Field of Search ............................... 701/51, 1, 36; 475/149; 180/337, 338; 477/34

(56) References Cited

U.S. PATENT DOCUMENTS 4,656,475 A * 4/1987 Miller et al. ........... 340/825.57
5,833,564 A * 11/1998 Harris .......................... 475/149
2004/0040375 A1 * 3/2004 Kadota et al. ................ 73/116
2004/0065490 A1 * 4/2004 Saito et al. .................. 180/65.1

FOREIGN PATENT DOCUMENTS

JP       U 6-4461      1/1994
JP       A 10-166965   6/1998

* cited by examiner

Primary Examiner—Thomas G. Black
Assistant Examiner—Olga Hernandez
(74) Attorney, Agent, or Firm—Oliff & Berridge, PLC (57) ABSTRACT

A transmission electronic control unit includes an operation detection section for detecting the operation state of a transmission, a pulse width control section for controlling the pulse width of a current flown into a linear solenoid for operating the transmission, a constant current control section for controlling the current flown into the linear solenoid to a constant value, and an energization control section. The energization control section is responsive to detection output of the operation detection section, for performing switch control between the operation of the constant current control section and the operation of the pulse width control section so that the constant current control section energizes the linear solenoid when the operation of the transmission is placed in a constant state and that the pulse width control section energizes the linear solenoid when the operation of the transmission is not placed in the constant state.

8 Claims, 7 Drawing Sheets

TRANSMISSION ELECTRONIC CONTROL UNIT

The present disclosure relates to the subject matter contained in Japanese Patent Application No. 2002-84505 filed on Mar. 25, 2002, which is incorporated herein by reference in its entirety.

BACKGROUND OF THE INVENTION

1. Field of the Invention

This invention relates to a transmission electronic control unit for controlling the operation of a transmission installed in a vehicle.

2. Description of the Related Art

As a transmission being installed in a vehicle for converting the rotation speed of an output shaft of an engine into various rotation speeds to smooth running of the vehicle, automatic transmissions compatible with vehicles called automatic cars have been mostly used in place of conventional manual transmissions. The automatic transmission is provided with a transmission electronic control unit (ECU) for controlling the automatic transmission operation of the automatic transmission.

A transmission installed in a vehicle is placed in the proximity of an engine in an engine compartment in which the engine is housed. However, formerly the transmission ECU was placed in a cabin of a kind of living space for passengers in a state in which the transmission ECU was at a distance from the transmission. In recent years, the installation locations of the transmission ECU and other ECUs have been changed to an engine compartment because of demands for enlarging the cabin volume intended for improving the comfort of the cabin and optimization of in-cabin placement of an audio machine, a navigation system, etc.

Since the transmission ECU and other ECUs use various semiconductor parts, the endurance assurance temperature is about 125° C. to 150° C. When the transmission ECU is placed in the cabin as ever, the environmental temperature to which the transmission ECU is exposed is about 80° C. at the maximum. Therefore, if temperature rise caused by self-heating as the transmission ECU operates is added, the temperature of the transmission ECU does not reach 125° C. to 150° C., the endurance assurance temperature mentioned above, and there is no fear of damage to the semiconductor parts contained in the transmission ECU.

However, when the transmission ECU is placed in the engine compartment, the temperature in the engine compartment becomes 120° C. to 150° C. because of heat generated by the engine. Thus, if temperature rise caused by self-heating as the transmission ECU operates is further added, the temperature of the transmission ECU exceeds the endurance assurance temperature and damage to the semiconductor parts occurs; this is a problem.

To solve the problem as described above, for example, JP-A-10-166965 and JP-UM-A-6-4461 disclose related arts for suppressing the temperature rise of the transmission ECU. In these publications, the temperature of a transmission ECU or the temperature having a correlation with the temperature of the transmission ECU is detected and when the detected temperature is equal to or greater than a predetermined temperature, power supply or a part of power supply to the transmission ECU is shut off for stopping the operation of the transmission ECU, thereby suppressing self-heating of the transmission ECU.

In the publications, however, the power supply is shut off simply based on the temperature of the transmission ECU independently of the run state of the vehicle, namely, the operation state of the transmission. Therefore, it is feared that even evacuation running of the vehicle will be made impossible.

SUMMARY OF THE INVENTION

It is an object of the invention to provide a transmission electronic control unit capable of controlling self-heating in response to the operation state of a transmission and suppressing a temperature rise.

According to a first aspect of the invention, a transmission electronic control unit is installed in a vehicle for controlling operation of a transmission installed in the vehicle. The transmission electronic control unit includes a pulse width control section, a constant current control section, and an energization control section. The pulse width control section performs pulse width control of a current flown into a drive circuit for operating the transmission. The constant current control section controls the current flown into the drive circuit for operating the transmission to a constant value. The energization control section performs switch control between the operation of the constant current control section and the operation of the pulse width control section so that the constant current control section energizes the drive circuit when the operation of the transmission is placed in a constant state and that the pulse width control section energizes the drive circuit when the operation of the transmission is not placed in the constant state.

In the first aspect of the invention, the energization control section performs switch control so that the constant current control section energizes the drive circuit for operating the transmission when the operation of the transmission is placed in the constant state and that the pulse width control section energizes the drive circuit when the operation of the transmission is not placed in the constant state. Accordingly, heat generation in the transmission electronic control unit (ECU) is distributed between heat generation of the pulse width control section and heat generation of the constant current control section in response to the operation state of the transmission, so that the self-heating value of the transmission ECU is suppressed. Therefore, if the transmission ECU is placed in an engine compartment, the temperature does not exceed the assurance temperature and thus damage to the semiconductor parts, etc., placed in the transmission ECU is prevented.

According to a second aspect of the invention, a transmission electronic control unit is installed in a vehicle for controlling operation of a transmission installed in the vehicle. The transmission electronic control unit includes a pulse width control section and an energization control section. The pulse width control section performs pulse width control of a current flown into a drive circuit for operating the transmission. The energization control section controls the operation of the pulse width control section so that a pulse period (T1) of the current flown into the drive circuit when the operation of the transmission is placed in a constant state becomes larger than that (T2) of the current flown into the drive circuit when the operation of the transmission is not placed in the constant state.

In the second aspect of the invention, the energization control section controls the operation of the pulse width control section so that as pulse periods of the current flown into the drive circuit for operating the transmission, the pulse period T1 when the operation of the transmission is placed in a constant state becomes larger than the pulse period T2 when the operation of the transmission is not placed in a constant state. Accordingly, when the operation of the transmission is placed in a constant state, the number of switching times per unit time in the pulse width control section is decreased, so that the self-heating value of the pulse width control section based on the switching operation, namely, the self-heating value of the transmission ECU is suppressed. Therefore, if the transmission ECU is placed in an engine compartment, the temperature does not exceed the assurance temperature and thus damage to the semiconductor parts, etc., placed in the transmission ECU can be prevented.

According to a third aspect of the invention, a transmission electronic control unit is installed in a vehicle for controlling operation of a transmission installed in the vehicle. The transmission electronic control unit includes an operation detection section, a plurality of switching sections, and an energization control section. The operation detection section detects the operation state of the transmission. The plurality of switching sections is provided in a one-to-one correspondence with a plurality of drive circuits. The switching sections operate the transmission for connecting/shutting off energization of the corresponding drive circuits. The energization control section controls the operation of the plurality of switching sections separately so as to shut off energization of the drive circuits not required for the operation of the transmission.

In the third aspect of the invention, the operation detection section detects the operation state of the transmission and the energization control section separately controls connecting/shutting off the switching section provided in a one-to-one correspondence with the plurality of drive circuits for operating the transmission in response to output of the operation detection section. Accordingly, when the operation of the transmission is placed in a constant state, only the drive circuit required for holding the operation of the transmission in a constant state can be selected from among the drive circuits placed in the transmission ECU, only the switching section provided for the drive circuit required for operating the transmission can be brought into conduction, and the switching section provided for other drive circuits not required for operating the transmission can be shut off. That is, the number of the drive circuits brought into conduction by the switching section when the operation of the transmission is placed in a constant state can be lessened as compared with the number of the drive circuits brought into conduction by the switching section when the operation of the transmission is not placed in a constant state, so that the self-heating value of the transmission ECU is suppressed. Therefore, if the transmission ECU is placed in an engine compartment, the temperature does not exceed the assurance temperature and thus damage to the semiconductor parts, etc., placed in the transmission ECU can be prevented.

In the third aspect of the invention, the operation detection section may includes at least one selected from the group consisting of an accelerator opening sensor for detecting accelerator opening, an engine rotation sensor for detecting rotation speed of an engine, a speed sensor for detecting running speed of the vehicle, a turbine rotation sensor for detecting rotation speed of a turbine, a range sensor for detecting a working range of the transmission, a cruise sensor for detecting a cruise state of a state in which a run condition of the vehicle is set automatically, a navigation system, a laser radar, and a vehicle-installed camera.

In the above case, the operation detection section includes at least one member selected from the group consisting of an accelerator opening sensor, an engine rotation sensor, a speed sensor, a turbine rotation sensor, a range sensor, a cruise sensor, a navigation system, a laser radar, and a vehicle-installed camera. Thus, the operation detection section of the transmission is made up of the at least one member selected from among the members, so that operation detection of the transmission can be accomplished easily. A plurality of members selected from the group are used as the operation detection section of the transmission, whereby the control accuracy of the energization control section for executing the control operation in response to output of the operation detection section can be improved.

DETAILED DESCRIPTION OF THE PREFERRED EMBODIMENT

Figure 1:
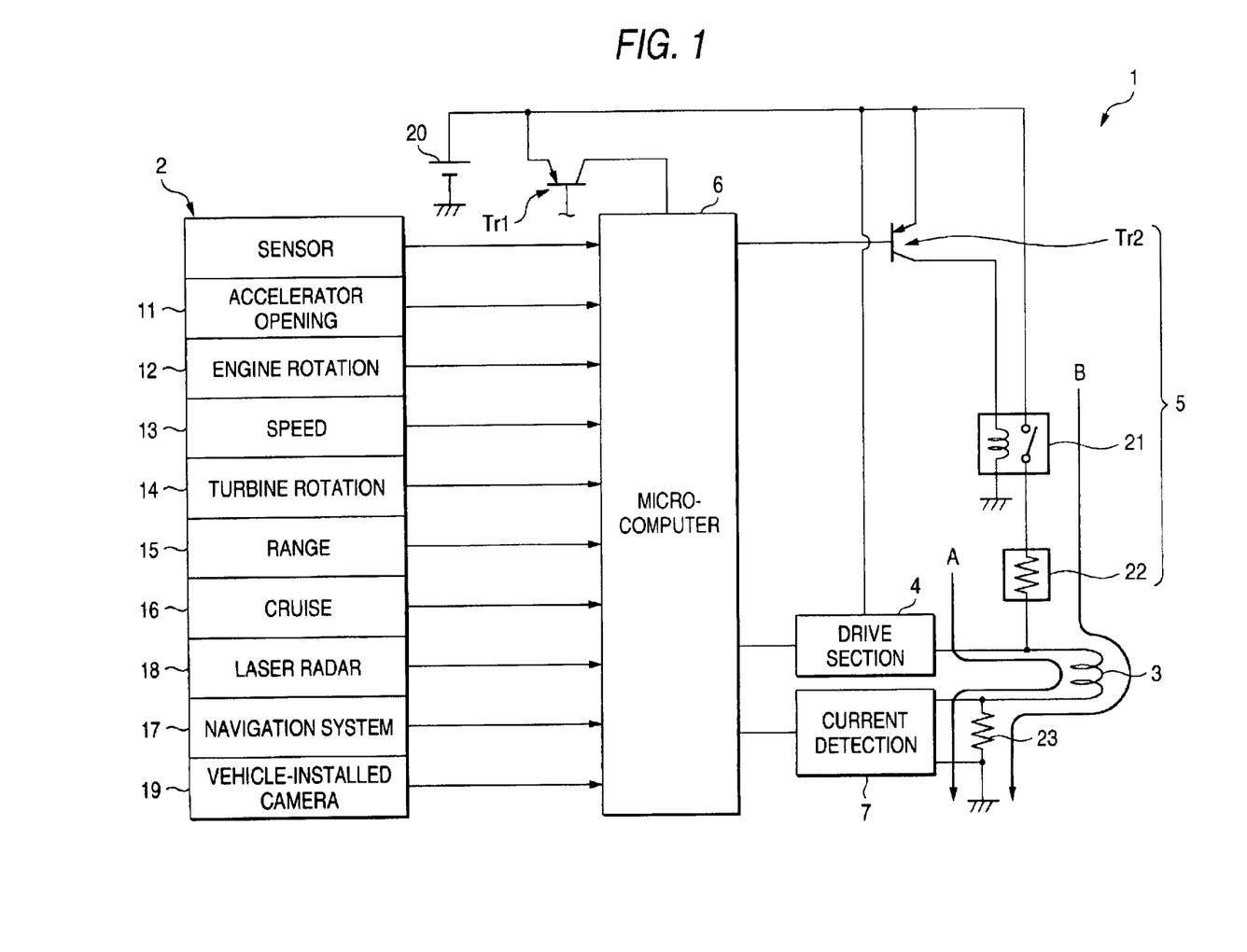
FIG. 1 is a schematic diagram to show the configuration of a transmission ECU 1 of a first embodiment of the invention.

FIG. 1 is a schematic diagram to show the configuration of a transmission ECU 1 according to a first embodiment of the invention. The transmission ECU 1 of the first embodiment is a transmission ECU 1 for controlling the operation of a transmission installed in a vehicle; it includes an operation detection section 2 for detecting the operation state of the transmission, a pulse width control section 4 for controlling the pulse width of a current flown into a drive circuit 3 for operating the transmission, a constant current control section 5 for controlling the current flown into the drive circuit 3 for operating the transmission to be a constant value, an energization control section 6 being responsive to detection output of the operation detection section 2, for performing switch control between the operation of the constant current control section 5 and the operation of the pulse width control section 4 so that the constant current control section 5 energizes the drive circuit 3 when the operation of the transmission is placed in a constant state and that the pulse width control section 4 energizes the drive circuit 3 when the operation of the transmission is not placed in a constant state, and a current detection section 7 for detecting the current of the drive circuit 3.

The expression "the operation of the transmission is placed in a constant state" can be used to indicate a case where gear change need not be conducted, such as an idling state, a high-speed run state, a long downhill run state, or a crawl drive state at congestion time or at slow speed in which the vehicle runs at constant speed, for example.

The operation detection section 2 includes one or more sensors selected from the group consisting of an accelerator opening sensor 11 for detecting accelerator opening, an engine rotation sensor 12 for detecting the rotation speed of an engine, a speed sensor 13 for detecting the running speed of the vehicle, a turbine rotation sensor 14 for detecting the rotation speed of a turbine of the transmission, a range sensor 15 for detecting the working range of the transmission, a cruise sensor 16 for detecting a cruise state of a state in which some of run conditions of the vehicle are set automatically, a navigation system 17, a laser radar 18, and a vehicle-installed camera 19.

The operation detection section 2 can detect the transmission operation being placed in the constant state, for example, by setting the following detection level for each sensor:

The accelerator opening sensor 11 is set so that it is determined that the transmission operation is placed in the constant state when the opening of a throttle valve is 30% or more. The engine rotation sensor 12 is set so that it is determined that the transmission operation is placed in the constant state when the rotation speed of the engine is 2000 min$^{-1}$ or more. The speed sensor 13 is set so that it is determined that the transmission operation is placed in the constant state when the running speed of the vehicle is 60 km/hour or more or 10 km/hour or less.

The range sensor 15 is set so that it is determined that the transmission operation is placed in the constant state when the range is entered in the engine brake working range in long downhill running. The cruise sensor 16 is set so that it is determined that the transmission operation is placed in the constant state when automatic run control is performed so that the running speed of the vehicle becomes within a predetermined fluctuation range relative to the selected and setup speed. The navigation system 17 is set so that it is determined that the transmission operation is placed in the constant state when the time progression of the vehicle position is detected and the move speed and the direction of the vehicle position are within a predetermined range. The laser radar 18 and the vehicle-installed camera 19 are used as distance sensors for detecting the distance between the vehicle and the ahead running vehicle; they are set so that it is determined that the transmission operation is placed in the constant state when the detected vehicle-to-vehicle distance is within a predetermined range.

The energization control section 6 determines whether or not the transmission operation is placed in the constant state in response to detection output of each sensor based on the setting of the determination level of each sensor as described above. The sensors 11 to 19 need not all installed in the transmission ECU 1 and one or more sensors may be selected from the sensor group as mentioned above for installation.

Therefore, one or more sensors fitted for the vehicle type and vehicle use can be selected for installation, so that operation detection of the transmission can be accomplished easily. A plurality of sensors are used as the operation detection section 2 of the transmission, whereby if it is determined that the transmission operation is placed in the constant state when the determination result based on the detection output of a predetermined number of the sensors satisfies the determination level, the control accuracy of the energization control section 6 for executing the control operation in response to output of the operation detection section 2 can be improved.

The energization control section 6 is a processing circuit implemented as a microcomputer installing a CPU (central processing unit), etc., for example. It may be represented as the microcomputer. The energization control section 6 is provided with memory (not shown) previously storing a program for operating the transmission ECU 1 and storing the determination levels set for the sensors 11 to 19 making up the operation detection section 2. The energization control section 6 determines whether or not the transmission operation is placed in the constant state based on the detection output of the operation detection section 2 and performs switch control between the operation of the constant current control section 5 and the operation of the pulse width control section 4 based on the determination result according to the program read from the memory. Operation power of the energization control section 6 is adjusted to voltage fitted for the operation of the energization control section 6 and is supplied thereto through a transistor Tr1 from a battery 20 of a power supply installed in the vehicle.

The drive circuit 3 for operating the transmission is a linear solenoid, for example. A magnetic field produced as a current is allowed to flow into the linear solenoid 3 can be used to operate the transmission.

The pulse width control section 4 is placed between the energization control section 6 and the linear solenoid 3 and is electrically connected to both the members 6 and 3. It may be represented as the drive section. The pulse width control section 4 performs PWM (pulse width modulation) control of the current supplied from the battery 20 of the power supply to the linear solenoid 3. When the transmission performs the gear change operation in accordance with the PWM control by the pulse width control section 4, the current of a current value responsive to the operation state thereof is allowed to flow into the linear solenoid 3.

Figure 2A:
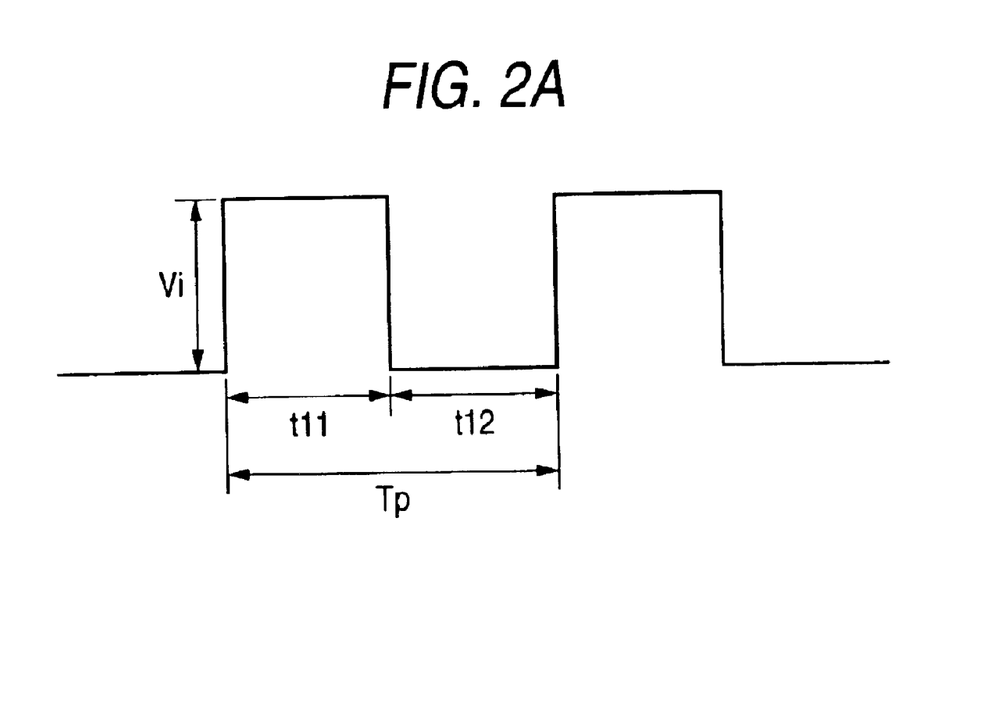
FIGS. 2A and 2B are drawings to describe an outline of PWM control.
Figure 2B:
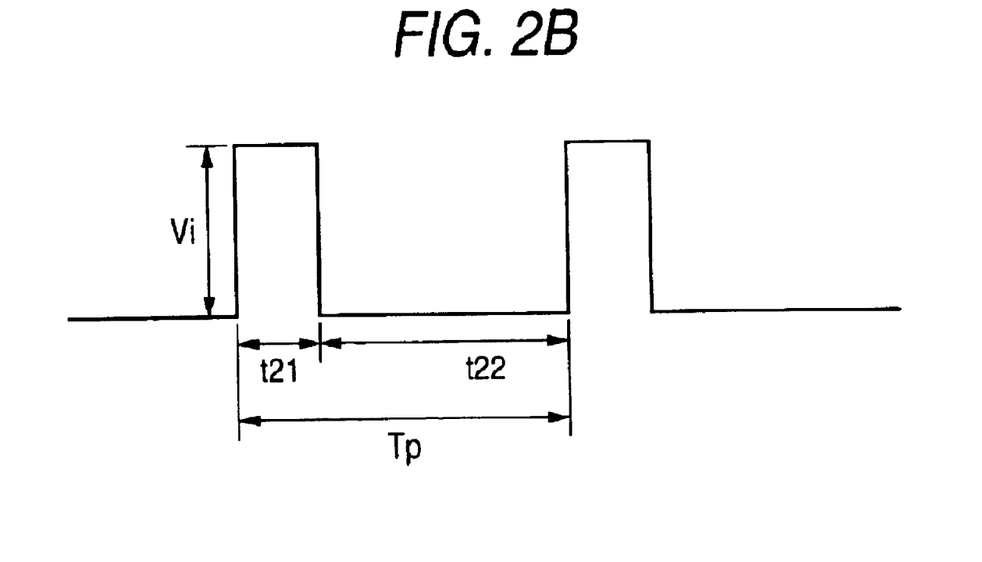

FIGS. 2A and 2B are drawings to describe an outline of PWM control. The pulse width control section 4 uses a switch function of a transistor to change the pulse width of an output voltage for controlling the average output voltage value. An example of outputting a voltage in a period Tp from the pulse width control section 4 as shown in FIGS. 2A and 2B will be discussed.

As shown in FIG. 2A, letting the time during which output voltage value is Vi be t11 and the time during which output voltage value is 0 be t12 (where t11+t12=Tp), output average voltage value Va is given by expression (1). As shown in FIG. 2B, letting the time during which output voltage value is Vi be t21 and the time during which output voltage value is 0 be t22 (where t21+t22=Tp), output average voltage value Vb is given by expression (2).

$$Va = Vi \times t11/Tp \tag{1}$$

$$Vb = Vi \times t21/Tp \tag{2}$$

Here, the ratio of the output time of the voltage value Vi to the period Tp (t11/Tp in expression (1), t21/Tp in expression (2)) is called duty. The pulse width control section 4 can control the duty, namely, the pulse time of the output voltage according to an output signal from the energization control section 6, thereby controlling the average voltage value supplied from the battery 20 to the pulse width control section 4 and output from the pulse width control section 4. The voltage output by the pulse width control section 4 is divided by resistance of the linear solenoid 3, whereby a current flowing through the linear solenoid 3 can be provided and therefore the pulse width control section 4 controls the output pulse width, thereby controlling the current.

When controlling the current flowing into the linear solenoid 3, the pulse width control section 4 generates heat by repeating the ON/OFF switching operation, causing the temperature of the transmission ECU 1 to rise. Power consumed in the pulse width control section 4 without being output by the PWM control of the pulse width control section 4 although it is supplied from the battery 20 to the pulse width control section 4 also becomes heat, thus causing the temperature of the transmission ECU 1 to rise.

Referring again to FIG. 1, the constant current control section 5 includes a relay circuit 21, a current limiting resistor 22, and a transistor Tr2. Power from the battery 20 is supplied through there lay circuit 21 and the current limiting resistor 22 to the linear solenoid 3. The transistor Tr2 has a switch function; it has a base connected to the energization control section 6 and performs on/off operation according to an output signal from the energization control section 6 for connecting/shutting off energization of the relay circuit 21 from the battery 20. When the transistor Tr2 is on, the relay circuit 21 is brought into conduction, allowing current to flow into the linear solenoid 3 through the current limiting resistor 22. At this time, the current value of the current flowing through the linear solenoid 3 becomes a constant current value provided by dividing the voltage value of the voltage applied by the battery 20 by resistance of the current limiting resistor 22 and the linear solenoid 3. When the transistor Tr2 is off, the relay circuit 21 is shut off, shutting off energization of the current limiting resistor 22 and the linear solenoid 3.

The constant current control section 5 and the pulse width control section 4 are placed away from each other without being made contiguous and energization of the linear solenoid 3 is conducted from either of the pulse width control section 4 and the constant current control section 5, which are switched in response to the operation state of the transmission, whereby the heating positions can be distributed.

The current detection section 7 detects a current value in a current detection resistor 23 placed on the ground side of the linear solenoid 3, and gives detection output to the energization control section 6. Then, the energization control section 6 performs feedback control of the operation of the pulse width control section 4 based on the detection output of the current detection section 7.

Figure 3:
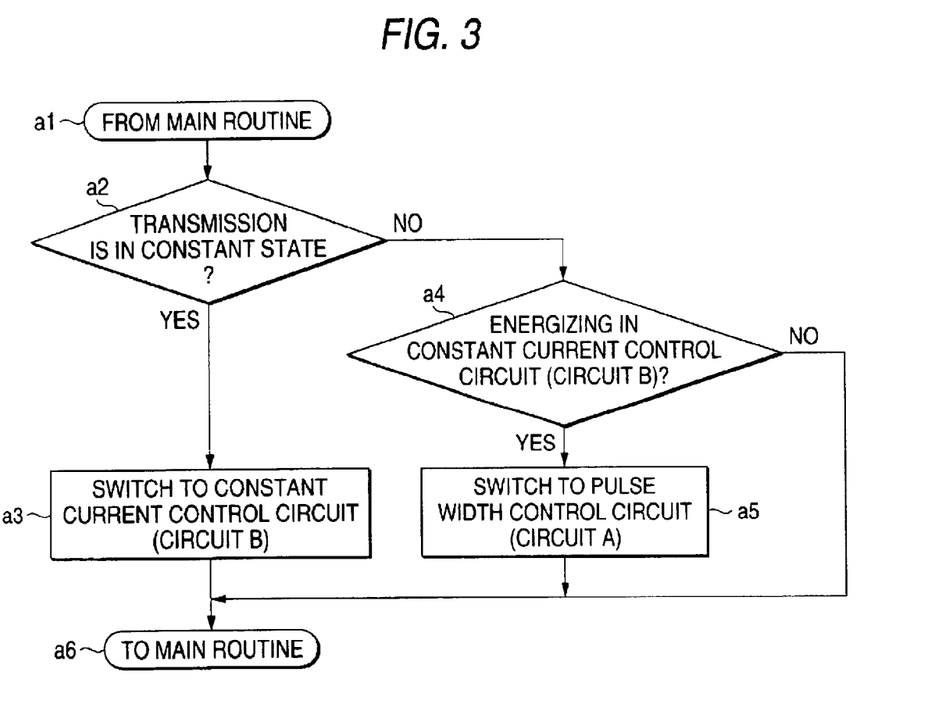
FIG. 3 is a flowchart to describe the control operation of energization of a linear solenoid 3 by an energization control section 6 placed in the transmission ECU 1.

FIG. 3 is a flowchart to describe the control operation of energization of the linear solenoid 3 by the energization control section 6 placed in the transmission ECU 1. At step a1, the transmission control operation is executed in a main routine of the control operation program of the transmission ECU 1. At step a2, a transition is made to a routine for controlling energization of the linear solenoid 3 and the operation detection section 2 detects the operation state of the transmission and the energization control section 6 determines whether or not the transmission operation is placed in the constant state based on the detection output of the operation detection section 2.

If it is determined that the transmission operation is placed in the constant state, control goes to step a3. At step a3, since the transmission operation is placed in the constant state, the energization control section 6 outputs a control signal to the pulse width control section 4 to set the output voltage thereof to 0 and outputs a control signal to the constant current control section 5 to turn on the transistor Tr2. Accordingly, the relay circuit 21 is brought into conduction and power from the battery 20 is supplied through the current limiting resistor 22 to the linear solenoid 3. That is, the current flows through a circuit B shown in FIG. 1. From step a3, control returns to the main routine at step a6.

If it is not determined at step a2 that the transmission operation is placed in the constant state, control goes to step a4. At step a4, whether or not the constant current control section 5 conducts power supply from the battery 20 is determined. This determination is possible as the energization control section 6 determines whether the current value detected by the current detection section 7 is constant or fluctuates. If it is determined that the constant current control section 5 conducts power supply from the battery 20, the energization control section 6 outputs a control signal to the constant current control section 5 to turn off the transistor Tr2 and outputs a control signal to the pulse width control section 4 to perform pulse width control of the output voltage thereof. Accordingly, the relay circuit 21 is shut off and power from the battery 20 is supplied through the pulse width control section 4 to the linear solenoid 3. That is, the current flows through a circuit A shown in FIG. 1. From step a5, control returns to the main routine at step a6. If it is not determined at step a4 that the constant current control section 5 conducts power supply from the battery 20, namely, if the pulse width control section 4 conducts power supply from the battery 20, control returns to the main routine at step a6.

Thus, heat generation in the transmission ECU 1 is distributed between heat generation of the pulse width control section 4 and heat generation of the constant current control section 5 in response to the operation state of the transmission, so that the temperature rise caused by self-heating of the transmission ECU 1 is suppressed. Therefore, if the transmission ECU 1 is placed in the engine compartment, the temperature does not exceed the assurance temperature and thus damage to the semiconductor parts, etc., placed in the transmission ECU 1 is prevented.

Figure 4:
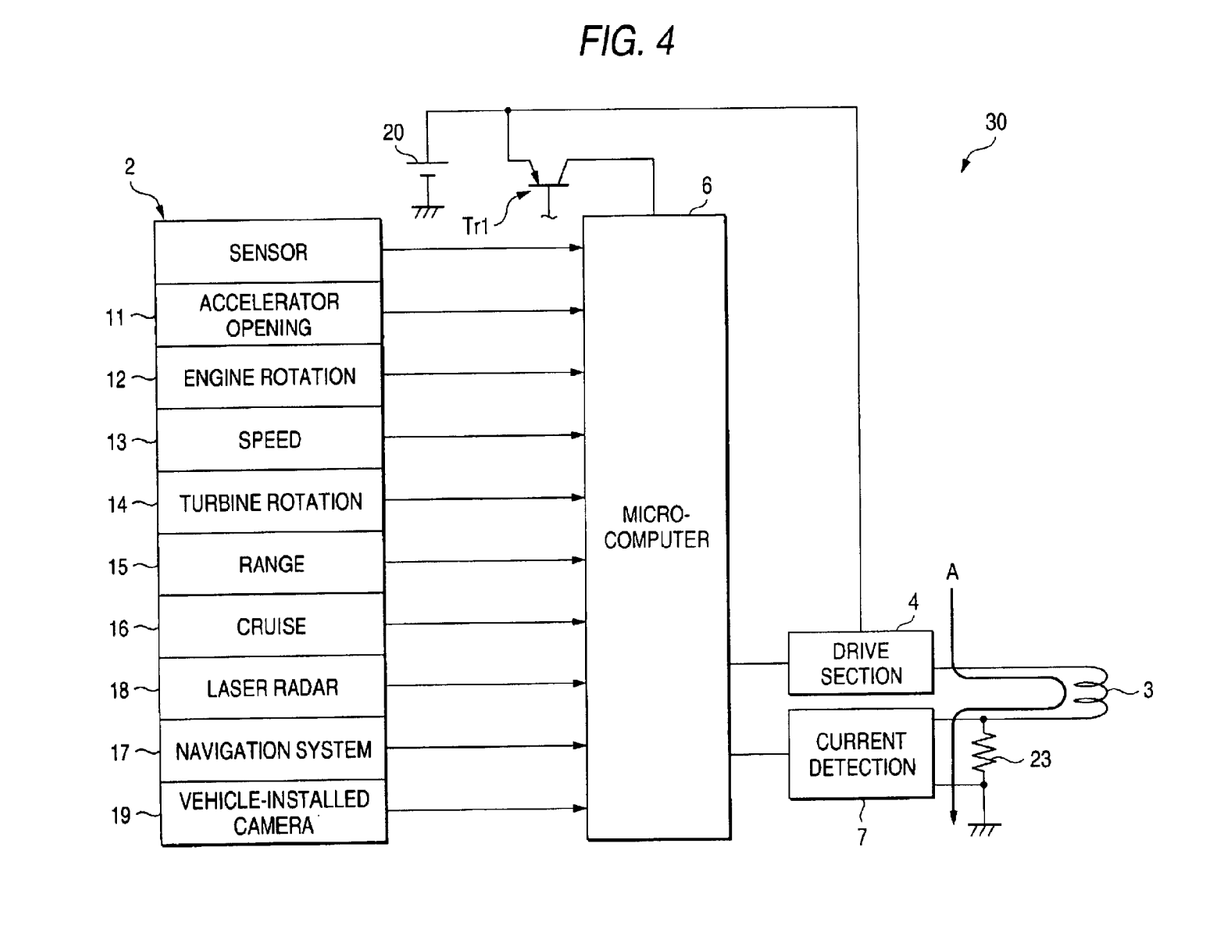
FIG. 4 is a schematic diagram to show the configuration of a transmission ECU 30 of a second embodiment of the invention.

FIG. 4 is a schematic diagram to show the configuration of a transmission ECU 30 according to a second embodiment of the invention. The transmission ECU 30 of the embodiment is similar to the transmission ECU 1 of the first embodiment. Parts identical with or similar to those previously described with reference to FIG. 1 are denoted by the same reference numerals in FIG. 4 and will not be discussed again.

Figure 5A:
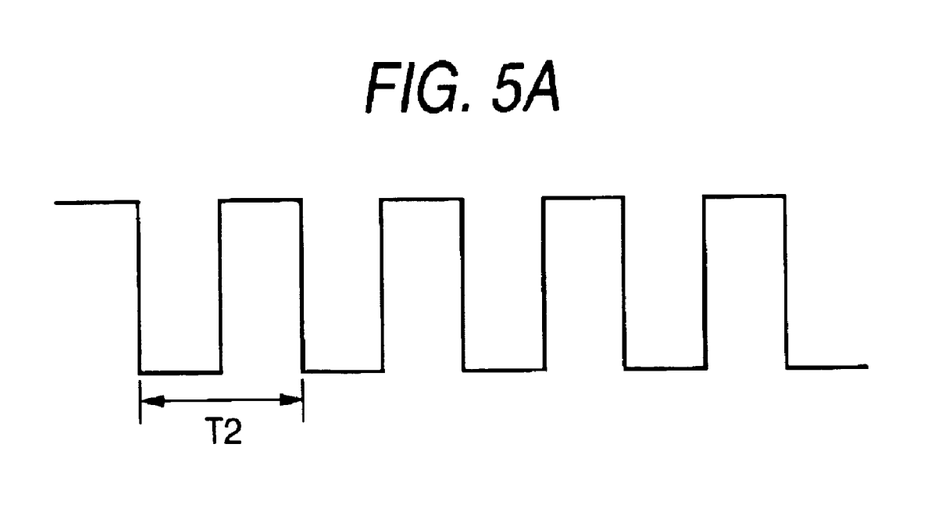
FIGS. 5A and 5B are drawings to describe an outline of PWM control of a pulse width control section 4 placed in the transmission ECU 30.
Figure 5B:
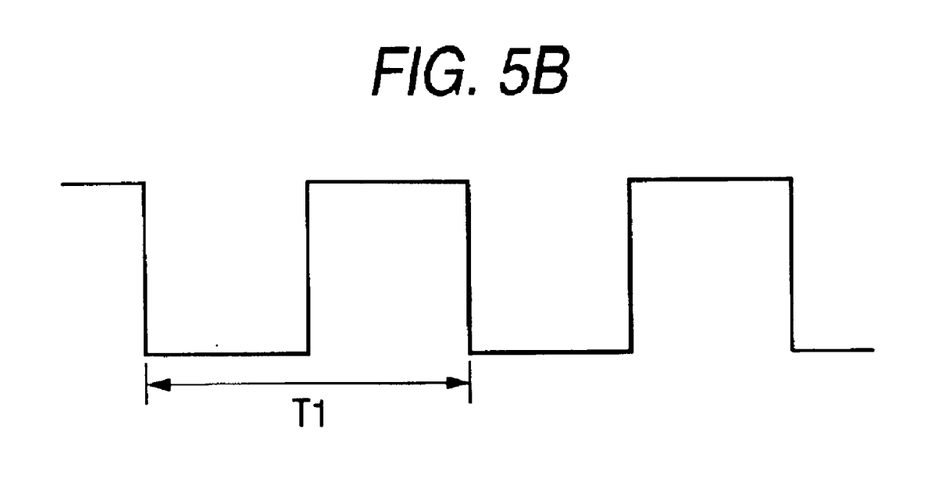

The transmission ECU 30 does not include a constant current control section 5. FIGS. 5A and 5B are drawings to describe an outline of PWM control of a pulse width control section 4 placed in the transmission ECU 30. FIG. 5A shows that when the transmission operation is not placed in a constant state, the pulse width control section 4 performs PWM control of power supplied from a battery 20 so that the pulse period becomes T2 in response to detection output of an operation detection section 2. FIG. 5B shows that when the transmission operation is placed in the constant state, the pulse width control section 4 performs PWM control of power supplied from the battery 20 so that a pulse period T1 is made longer than the pulse period T2 in response to detection output of the operation detection section 2.

As shown in FIGS. 5A and 5B, in the transmission ECU 30, an energization control section 6 controls the operation of the pulse width control section 4 so that the pulse period T1 of the current flown into a linear solenoid 3 when the transmission operation is placed in the constant state becomes larger than the pulse period T2 of the current flown into the linear solenoid 3 when the transmission operation is not placed in the constant state (T1>T2) in response to detection output of the operation detection section 2.

Thus, when the transmission operation is placed in the constant state, operation control is performed so that the period of an output pulse of the pulse width control section 4 is prolonged, whereby the number of on/off switching times per unit time can be decreased, so that the heating value caused by switching is reduced and temperature rise in the transmission ECU 30 is suppressed. Therefore, if the transmission ECU 30 is placed in the engine compartment, the temperature does not exceed the assurance temperature and thus damage to the semiconductor parts, etc., placed in the transmission ECU 30 is prevented.

Figure 6:
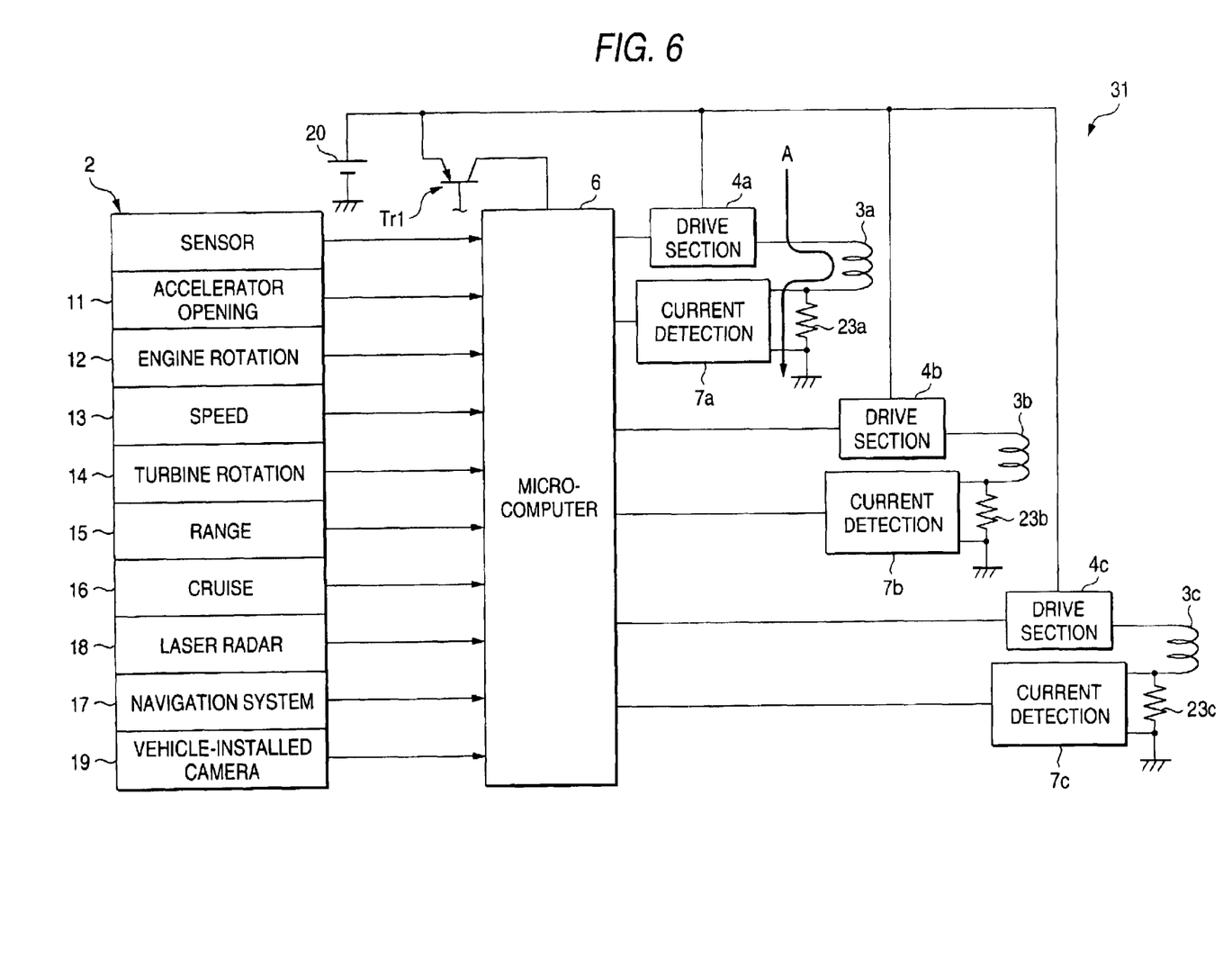
FIG. 6 is a schematic diagram to show the configuration of a transmission ECU 31 of a third embodiment of the invention.

FIG. 6 is a schematic diagram to show the configuration of a transmission ECU 31 according to a third embodiment of the invention. The transmission ECU 31 of the embodiment is similar to the transmission ECU 30 of the second embodiment. Parts identical with or similar to those previously described with reference to FIG. 4 are denoted by the same reference numerals in FIG. 6 and will not be discussed again.

The transmission ECU 31 of the embodiment includes a plurality of first to third linear solenoids 3a, 3b, and 3c (in the embodiment, three linear solenoids) for operating a transmission, and the first to third linear solenoids 3a, 3b, and 3c are provided with first to third pulse width control sections 4a, 4b, and 4c of switching units for connecting/shutting off energization of the linear solenoids 3. First to third current detection sections 7a, 7b, and 7c and first to third current detection resistors 23a, 23b, and 23c are connected to the first to third linear solenoids 3a, 3b, and 3c. To collectively call a plurality of linear solenoids 3, a plurality of a pulse width control section 4, and a plurality of current detection sections 7 and current detection resistors 23 being connected to the linear solenoids 3 for detecting the current values thereof in the embodiment, suffixes are omitted.

An energization control section 6 placed in the transmission ECU 31 controls the switching operation of the first to third a pulse width control section 4a, 4b, and 4c separately so as to switch between connection and shutting off of energization of the first to third linear solenoids 3a, 3b, and 3c in response to output of an operation detection section 2. Accordingly, the energization control section 6 can operate only the linear solenoid required for the transmission operation when the transmission operation is placed in the constant state.

A predetermined operation condition is stored in memory placed in the energization control section 6 so that, for example, when the transmission operation is placed in the constant state, various types of control are not required for the transmission ECU 31 and therefore energization of only the first linear solenoid 3a among the first to third linear solenoids 3a, 3b, and 3c is connected for operating the first linear solenoid 3a and energization of the second and third linear solenoids 3b and 3c is shut off for stopping the operation thereof.

When the operation condition of the linear solenoids 3 is predetermined, if the energization control section 6 determines that the transmission operation is placed in the constant state in response to detection output of the operation detection section 2, the energization control section 6 reads the operation condition of the linear solenoids 3 from the memory and outputs a control signal to the first pulse width control section 4a for energizing only the first linear solenoid 3a to operate the transmission with the first linear solenoid 3a only operated. At this time, the energization control section 6 outputs a control signal for shutting off energization to the second and third a pulse width control section 4b and 4c so that the second and third linear solenoids 3b and 3c are not energized.

In the embodiment, the number of the linear solenoids is three, but the invention is not limited to it. Patterns of combinations of the numbers of linear solenoids to be energized for operation and the numbers of linear solenoids to be not energized for stopping the operation in response to the output mode of the sensors used as the operation detection section 2 in the transmission ECU including a larger number of solenoids can be prepared and stored in the memory placed in the energization control section 6. Accordingly, it is made possible to energize only the linear solenoid required for operating the transmission in the constant state in response to detection output of each of the sensors making up the operation detection section 2.

Figure 7:
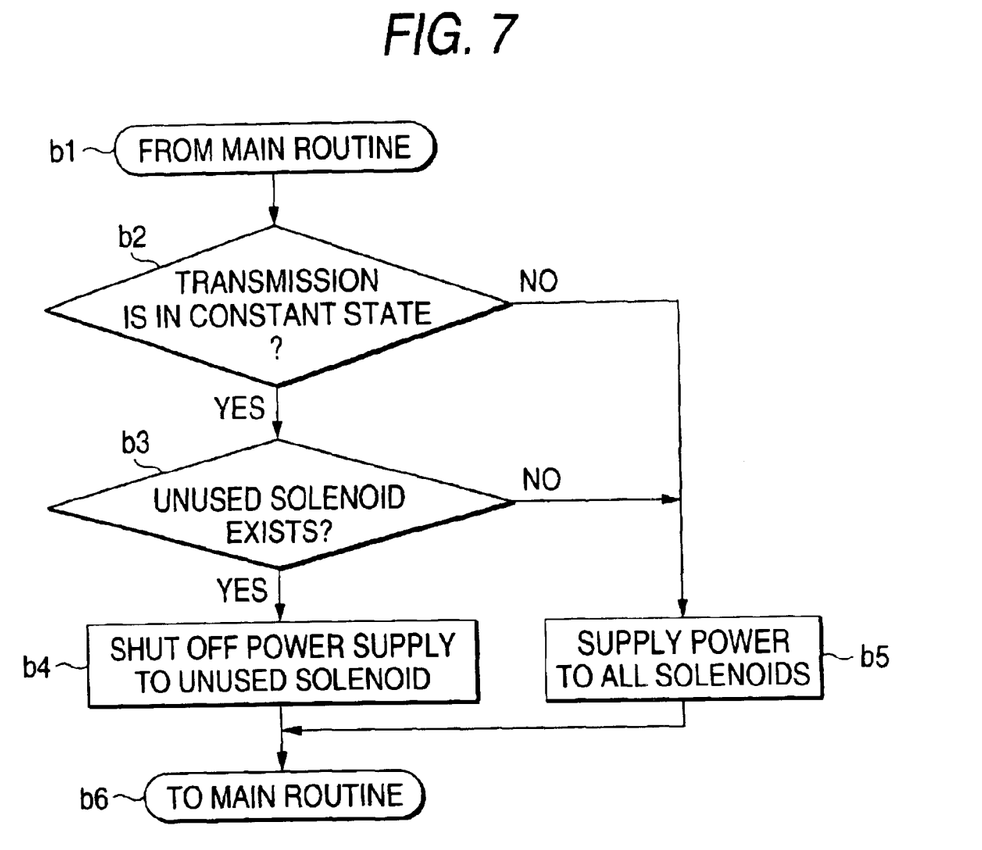
FIG. 7 is a flowchart to describe the control operation of energization of linear solenoids 3 by an energization control section 6 placed in the transmission ECU 31.

FIG. 7 is a flowchart to describe the control operation of energization of the linear solenoids 3 by an energization control section 6 placed in the transmission ECU 31. At step b1, the transmission control operation is executed in a main routine of a control operation program of the transmission ECU 31. At step b2, a transition is made to a routine for controlling energization of the linear solenoids 3 and the operation detection section 2 detects the operation state of the transmission and the energization control section 6 determines whether or not the transmission operation is placed in the constant state based on the detection output of the operation detection section 2.

If it is determined that the transmission operation is placed in a constant state, control goes to step b3. At step b3, the energization control section 6 reads the operation conditions of the linear solenoids 3 corresponding to the detection output of the operation detection section 2 from the memory and determines whether or not a solenoid to be not energized for stopping the operation thereof exists. If it is determined that a solenoid to be not energized for stopping the operation thereof exists, control goes to step b4. At step b4, the energization control section 6 outputs a control signal for shutting off energization, for example, to the second and third a pulse width control section 4b and 4c to stop the operation of the second and third linear solenoids 3b and 3c, and returns to the main routine at step b6.

If it is determined at step b2 that the transmission operation is not placed in a constant state or if it is determined at step b3 that a solenoid to be not energized for stopping the operation thereof does not exist although the transmission operation is placed in a constant state, all linear solenoids 3 placed in the transmission ECU 31 are energized for operating all the linear solenoids 3, and control returns to the main routine at step b6.

Thus, when the transmission operation is placed in a constant state, only the linear solenoid required for holding the transmission operation in a constant state can be selected from among the linear solenoids 3 placed in the transmission ECU 31, only the pulse width control section of the switching section provided for the linear solenoid required for operating the transmission can be brought into conduction, and the pulse width control section of the switching section provided for other linear solenoids not required for operating the transmission can be shut off.

That is, the number of the linear solenoids 3 brought into conduction by the pulse width control section 4 when the transmission operation is placed in a constant state can be lessened as compared with the number of the linear solenoids 3 brought into conduction by the pulse width control section 4 when the transmission operation is not placed in a constant state, so that the self-heating value of the transmission ECU 31 is suppressed. Therefore, if the transmission ECU 31 is placed in the engine compartment, the temperature does not exceed the assurance temperature and thus damage to the semiconductor parts, etc., placed in the transmission ECU 31 is prevented.

As described above, in the embodiment, the operation detection section 2 detects the operation state of the transmission, but the invention is not limited to it. Any other unit may detect the operation state of the transmission and may give the detection result to the energization control section 6.

According to the invention, the energization control section performs switch control so that the constant current control section energizes the drive circuit for operating the transmission when the operation of the transmission is placed in a constant state and that the pulse width control section energizes the drive circuit when the operation of the transmission is not placed in a constant state. Accordingly, heat generation in the transmission electronic control unit (ECU) is distributed between heat generation of the pulse width control section and heat generation of the constant current control section in response to the operation state of the transmission, so that the self-heating value of the transmission ECU is suppressed. Therefore, if the transmission ECU is placed in the engine compartment, the temperature does not exceed the assurance temperature and thus damage to the semiconductor parts, etc., placed in the transmission ECU is prevented.

According to the invention, the energization control section controls the operation of the pulse width control section so that as pulse periods of the current flown into the drive circuit for operating the transmission, the pulse period T1 when the operation of the transmission is placed in a constant state becomes larger than the pulse period T2 when the operation of the transmission is not placed in a constant state. Accordingly, when the operation of the transmission is placed in a constant state, the number of switching times per unit time in the pulse width control section is decreased, so that the self-heating value of the pulse width control section based on the switching operation, namely, the self-heating value of the transmission ECU is suppressed. Therefore, if the transmission ECU is placed in the engine compartment, the temperature does not exceed the assurance temperature and thus damage to the semiconductor parts, etc., placed in the transmission ECU can be prevented.

According to the invention, the operation detection section detects the operation state of the transmission and the energization control section separately controls connecting/shutting off the switching section provided in a one-to-one correspondence with the plurality of drive circuits for operating the transmission in response to output of the operation detection section. Accordingly, when the operation of the transmission is placed in a constant state, only the drive circuit required for holding the operation of the transmission in a constant state can be selected from among the drive circuits placed in the transmission ECU, only the switching section provided for the drive circuit required for operating the transmission can be brought into conduction, and the switching section provided for other drive circuits not required for operating the transmission can be shut off. That is, the number of the drive circuits brought into conduction by the switching section when the operation of the transmission is placed in a constant state can be lessened as compared with the number of the drive circuits brought into conduction by the switching section when the operation of the transmission is not placed in a constant state, so that the self-heating value of the transmission ECU is suppressed. Therefore, if the transmission ECU is placed in the engine compartment, the temperature does not exceed the assurance temperature and thus damage to the semiconductor parts, etc., placed in the transmission ECU can be prevented.

According to the invention, the operation detection section includes one or more members selected from the group consisting of an accelerator opening sensor, an engine rotation sensor, a speed sensor, a turbine rotation sensor, a range sensor, a cruise sensor, a navigation system, a laser radar, and a vehicle-installed camera. Thus, the operation detection section of the transmission is made up of one or more members selected from among the members, so that operation detection of the transmission can be accomplished easily. A plurality of members selected from the group are used as the operation detection section of the transmission, whereby the control accuracy of the energization control section for executing the control operation in response to output of the operation detection section can be improved.

What is claimed is:

1. A transmission electronic control unit being installed in a vehicle for controlling operation of a transmission installed in the vehicle, the transmission electronic control unit comprising:

a pulse width control section for performing pulse width control of a current flown into a drive circuit for operating the transmission;

a constant current control section for controlling the current flown into the drive circuit for operating the transmission to a constant value; and an energization control section for performing switch control between the operation of the constant current control section and the operation of the pulse width control section so that the constant current control section energizes the drive circuit when the operation of the transmission is placed in a constant state and that the pulse width control section energizes the drive circuit when the operation of the transmission is not placed in the constant state.

2. A transmission electronic control unit being installed in a vehicle for controlling operation of a transmission installed in the vehicle, the transmission electronic control unit comprising:

a pulse width control section for performing pulse width control of a current flown into a drive circuit for operating the transmission; and an energization control section for controlling the operation of the pulse width control section so that a pulse period of the current flown into the drive circuit when the operation of the transmission is placed in a constant state becomes larger than that of the current flown into the drive circuit when the operation of the transmission is not placed in the constant state.

3. A transmission electronic control unit being installed in a vehicle for controlling operation of a transmission installed in the vehicle, the transmission electronic control unit comprising:

an operation detection section for detecting the operation state of the transmission;

a plurality of switching sections provided in a one-to-one correspondence with a plurality of drive circuits, for operating the transmission for connecting/shutting off energization of the corresponding drive circuits; and an energization control section for controlling the operation of the plurality of switching sections separately so as to shut off energization of the drive circuits not required for the operation of the transmission.

4. The transmission electronic control unit according to claim 3, wherein the operation detection section includes: at least one selected from the group consisting of an accelerator opening sensor for detecting accelerator opening, an engine rotation sensor for detecting rotation speed of an engine, a speed sensor for detecting running speed of the vehicle, a turbine rotation sensor for detecting rotation speed of a turbine, a range sensor for detecting a working range of the transmission, a cruise sensor for detecting a cruise state of a state in which a run condition of the vehicle is set automatically, a navigation system, a laser radar, and a vehicle-installed camera.

5. The transmission electronic control unit according to claim 1, further comprising:

an operation detection section for detecting the operation state of the transmission, wherein the energization control section performs the switch control based on an output from the operation detection section.

6. The transmission electronic control unit according to claim 5, further comprising:

a current detection section for detecting a current output from the drive circuit, wherein the energization control section performs the switch control based on the output from the operation detection section and the current detected by the current detection section.

7. The transmission electronic control unit according to claim 2, further comprising:

an operation detection section for detecting the operation state of the transmission, wherein the energization control section performs the switch control based on an output from the operation detection section.

8. The transmission electronic control unit according to claim 7, further comprising:

a current detection section for detecting a current output from the drive circuit, wherein the energization control section performs the switch control based on the output from the operation detection section and the current detected by the current detection section.

* * * * *